(12) United States Patent
Smout et al.

(10) Patent No.: US 12,188,413 B2
(45) Date of Patent: Jan. 7, 2025

(54) GAS TURBINE ENGINE AND A METHOD OF OPERATING A HEAT EXCHANGER ASSEMBLY FOR A GAS TURBINE ENGINE

(71) Applicant: ROLLS-ROYCE plc, London (GB)

(72) Inventors: Peter D Smout, Solihull (GB); Vasileios Kyritsis, Derby (GB); Benjamin J Eastment, Bristol (GB); Paul S Mccabe, Derby (GB); Sebastiaan Bottenheim, Bristol (GB); Jason Chetwynd-Chatwin, Bristol (GB)

(73) Assignee: ROLLS-ROYCE plc, London (GB)

( * ) Notice: Subject to any disclaimer, the term of this patent is extended or adjusted under 35 U.S.C. 154(b) by 2 days.

(21) Appl. No.: 18/083,174

(22) Filed: Dec. 16, 2022

(65) Prior Publication Data

US 2023/0235700 A1    Jul. 27, 2023

(30) Foreign Application Priority Data

Jan. 27, 2022   (GR) .............................. 0220100081
Mar. 16, 2022   (GB) .................................. 2203636

(51) Int. Cl.
*F02C 7/141* (2006.01)

(52) U.S. Cl.
CPC ........ *F02C 7/141* (2013.01); *F05D 2220/323* (2013.01); *F05D 2260/213* (2013.01)

(58) Field of Classification Search
CPC .. F01D 11/24; F02K 3/115; F02K 3/06; F02C 7/14; F02C 7/18; F05D 2260/213
See application file for complete search history.

(56) References Cited

U.S. PATENT DOCUMENTS 5,203,163 A *  4/1993  Parsons ..................... F02C 6/08
                                                  60/785
8,776,952 B2 *  7/2014  Schwarz ................... F02C 7/14
                                                  184/104.1
9,816,438 B2 * 11/2017  Teia Dos Santos Medes
                        Gomes .................... F02C 7/185
(Continued)

FOREIGN PATENT DOCUMENTS

EP   0 511 770 A1   11/1992
EP   2 944 767 A1   11/2015
(Continued)

OTHER PUBLICATIONS

Aug. 30, 2022 Search and Examination Report issued in British Patent Application No. 2203636.2.
(Continued)

*Primary Examiner* — Jason H Duger
(74) *Attorney, Agent, or Firm* — Oliff PLC

(57) ABSTRACT

A gas turbine engine comprises a bypass duct and a heat exchanger assembly, the heat exchanger assembly comprising a heat exchanger and a heat exchanger duct having an inlet region, an inflection region and an outlet region. A direction of a centreline of the heat exchanger duct has a tangential component with respect to a principal rotational axis of the gas turbine engine at one or more of the inlet region, the inflection region and the outlet region. The heat exchanger is disposed within the inflection region and configured to transfer heat generated by the gas turbine engine into the flow of air as it passes through the inflection region.

17 Claims, 14 Drawing Sheets

(56) References Cited

U.S. PATENT DOCUMENTS

| | | | | |
|---|---|---|---|---|
| 2008/0028763 A1* | 2/2008 | Schwarz | ............... | F02K 1/1207 |
| | | | | 60/771 |
| 2009/0188232 A1 | 7/2009 | Suciu et al. | | |
| 2010/0074736 A1 | 3/2010 | Junod | | |
| 2019/0360400 A1* | 11/2019 | Elliott | ....................... | F02C 7/04 |
| 2020/0040765 A1 | 2/2020 | Walsh et al. | | |
| 2021/0285375 A1 | 9/2021 | Wiedenhoefer et al. | | |

FOREIGN PATENT DOCUMENTS

| | | |
|---|---|---|
| EP | 2 944 794 A1 | 11/2015 |
| EP | 3 561 279 A1 | 10/2019 |
| EP | 4 043 715 A2 | 8/2022 |
| WO | 92/11451 A1 | 7/1992 |

OTHER PUBLICATIONS

Jun. 16, 2023 Extended Search Report issued in European Patent Application No. 23150243.6.

* cited by examiner

GAS TURBINE ENGINE AND A METHOD OF OPERATING A HEAT EXCHANGER ASSEMBLY FOR A GAS TURBINE ENGINE

CROSS-REFERENCE TO RELATED APPLICATIONS

This specification is based upon and claims the benefit of priority from Greek Patent Application Number 20220100081 filed on Jan. 27, 2022, and UK Patent Application Number 2203636.2 filed on Mar. 16, 2022, the entire contents of which are incorporated herein by reference.

BACKGROUND

1 Field of the Disclosure

The present disclosure relates to a gas turbine engine and a method of operating a heat exchanger assembly for a gas turbine engine.

2 Description of the Related Art

Heat exchanger assemblies are known to be used in gas turbine engines for cooling components of the gas turbine engine. Heat generated in bearing chambers and gearboxes of the gas turbine engine is transferred by a process fluid such as a lubricating oil to a relatively cold fuel using a fuel-cooled oil cooler (FCOC). Excess heat remaining in the oil may be transferred to a flow of air via an air-cooled oil cooler (ACOC). The flow of air may originate from a bypass duct of a gas turbine engine or a ram air scoop. An ACOC may also be used to dissipate heat generated by other heat sources such as electrical generators, motors or electronics. Recent innovations in gas turbine engine technology have resulted in increased levels of heat generation within gas turbine engines, for example due to increasingly sophisticated gearbox and bearing arrangements.

It is therefore desirable to provide a gas turbine engine and a method of operating a heat exchanger assembly for a gas turbine engine that address this issue.

SUMMARY

According to a first aspect, there is provided a gas turbine engine comprising a bypass duct and a heat exchanger assembly, the heat exchanger assembly comprising a heat exchanger and a heat exchanger duct having an inlet region, an inflection region and an outlet region. The inlet region is configured to receive a flow of air from the bypass duct, the inflection region is configured to transfer the flow of air from the inlet region to the outlet region, and the outlet region is configured to discharge the flow of air into the bypass duct. A direction of a centreline of the heat exchanger duct has a tangential component with respect to a principal rotational axis of the gas turbine engine at one or more of the inlet region, the inflection region and the outlet region. The heat exchanger is disposed within the inflection region and configured to transfer heat generated by the gas turbine engine into the flow of air as it passes through the inflection region.

The heat exchanger may comprise an interior portion configured to transfer the heat generated by the gas turbine engine into the flow of air, an inlet face configured to transfer the flow of air to the interior portion and an outlet face configured to discharge the flow of air from the interior portion. The inlet face and the outlet face may be offset in a tangential direction with respect to the principal rotational axis.

The inlet face and the outlet face may be coplanar with the principal rotational axis.

The gas turbine engine may further comprise an engine core. The heat exchanger assembly may be disposed radially outward of the engine core and radially inward of the bypass duct. The heat exchanger may be configured to transfer heat generated by the engine core into the flow of air as it passes through the inflection region.

The heat exchanger may comprise a plurality of distinct fluid circuits. Each of the distinct fluid circuits may be fluidically connected to a respective distinct external fluid circuit of the engine core.

The centreline of the heat exchanger duct at the inlet region and the centreline of the heat exchanger duct at the outlet region may be parallel.

The heat exchanger duct may comprise an inlet region opening and an outlet region opening. The inlet region may be configured to receive the flow of air from the bypass duct of the gas turbine engine via the inlet region opening. The outlet region may be configured to discharge the flow of air into the bypass duct via the outlet region opening. The inlet region opening may be disposed at a first circumferential position about the principal rotational axis. The outlet region opening may be disposed at a second circumferential position about the principal rotational axis different from the first circumferential position.

The centreline of the heat exchanger duct at the inlet region and the centreline of the heat exchanger duct at the outlet region may be coplanar with the principal rotational axis.

The cross-sectional area of the heat exchanger duct on a plane perpendicular to the centreline at the inflection region may be greater than the cross-sectional area of the heat exchanger duct on a plane perpendicular to the centreline of the heat exchanger duct at the inlet region and the cross-sectional area of the heat exchanger duct on a plane perpendicular to the centreline of the heat exchanger duct at the outlet region.

The inlet region and the outlet region may be circumferentially offset with respect to the principal rotational axis such that the inlet region and the outlet region do not circumferentially overlap with respect to the principal rotational axis.

The centreline of the heat exchanger duct may be curved along the inflection region. The curvature of the centreline of the heat exchanger duct may change sign along the inflection region.

A direction of the centreline of the heat exchanger duct may not have a radial component with respect to the principal rotational axis.

The inflection region of the heat exchanger duct upstream of the heat exchanger may be defined by a first concave surface and a first convex surface circumferentially separated from each other with respect to the principal rotational axis. The heat exchanger duct downstream of the heat exchanger may be defined by a second concave surface and a second convex surface circumferentially separated from each other with respect to the principal rotational axis.

The heat exchanger assembly may further comprise a supplementary air supply opening positioned downstream of the heat exchanger at or adjacent the second convex surface and configured to supply a supplementary flow of air into the heat exchanger duct, onto or adjacent the second convex surface.

The heat exchanger assembly may further comprise an additional air supply opening positioned upstream of the heat exchanger at or adjacent the first concave surface and configured to supply an additional flow of air into the heat exchanger duct, onto or adjacent the first concave surface.

According to an aspect, there is provided a method of operating a heat exchanger assembly as stated in any preceding statement, the method comprising: determining a parameter of the gas turbine engine; and varying a parameter of the supplementary flow of air into the heat exchanger duct based on the parameter of the gas turbine engine and/or varying a parameter of the additional flow of air into the heat exchanger duct based on the parameter of the gas turbine engine. The parameter of the gas turbine engine includes at least one of a pressure of the flow of air within the bypass duct and a temperature of a process fluid exiting the heat exchanger. The parameter of the supplementary flow of air is a flow rate of the supplementary flow of air into the heat exchanger duct. The parameter of the additional flow of air includes at least one of a flow rate of the additional flow of air into the heat exchanger duct and/or a temperature of the additional flow of air into the heat exchanger duct.

According to an aspect, there is provided a method of operating a heat exchanger assembly as stated in any preceding statement, the method comprising: determining a parameter of the gas turbine engine; and varying a parameter of the supplementary flow of air into the heat exchanger duct based on the parameter of the gas turbine engine. The parameter of the gas turbine engine includes at least one of a pressure of the flow of air within the bypass duct and a temperature of a process fluid exiting the heat exchanger. The parameter of the supplementary flow of air is a flow rate of the supplementary flow of air into the heat exchanger duct.

According to an aspect, there is provided a method of operating a heat exchanger assembly as stated in any preceding statement, the method comprising: determining a parameter of the gas turbine engine; and varying a parameter of the additional flow of air into the heat exchanger duct based on the parameter of the gas turbine engine. The parameter of the gas turbine engine includes at least one of a pressure of the flow of air within the bypass duct and a temperature of a process fluid exiting the heat exchanger. The parameter of the additional flow of air includes at least one of a flow rate of the additional flow of air into the heat exchanger duct and/or a temperature of the additional flow of air into the heat exchanger duct.

The gas turbine engine may further comprise an additional heat exchanger assembly. The additional heat exchanger assembly may be accordance with the heat exchanger assembly of any preceding statement.

The heat exchanger of the heat exchanger assembly may be axially offset from and circumferentially aligned with the heat exchanger of the additional heat exchanger assembly with respect to the principal rotational axis.

The heat exchanger assembly and the additional heat exchanger assembly may be circumferentially offset with respect to the principal rotational axis.

The gas turbine engine may further comprise a septum wedge. The septum wedge may be disposed between and partially define the heat exchanger duct of the heat exchanger assembly and the heat exchanger duct of the additional heat exchanger assembly.

There may be provided a heat exchanger assembly as stated in any preceding statement or a heat exchanger arrangement as stated in any preceding statement.

According to an aspect, there is provided a heat exchanger assembly for a gas turbine engine, the heat exchanger assembly comprising a heat exchanger and a heat exchanger duct having an inlet region, an inflection region and an outlet region, wherein the inlet region is configured to receive a flow of air from a bypass duct of the gas turbine engine, the inflection region is configured to transfer the flow of air from the inlet region to the outlet region, and the outlet region is configured to discharge the flow of air into the bypass duct, wherein a direction of a centreline of the heat exchanger duct has a tangential component with respect to a principal rotational axis of the gas turbine engine at one or more of the inlet region, the inflection region and the outlet region, and wherein the heat exchanger is disposed within the inflection region and configured to transfer heat generated by the gas turbine engine into the flow of air as it passes through the inflection region.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg−1 s, 105 Nkg−1 s, 100 Nkg−1 s, 95 Nkg−1 s, 90 Nkg−1 s, 85 Nkg−1 s or 80 Nkg−1 s. The specific thrust may be in an inclusive range bounded by any two of the values in the previous sentence (i.e. the values may form upper or lower bounds), for example in the range of from 80 Nkg−1 s to 100 Nkg−1 s, or 85 Nkg−1 s to 95 Nkg-s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example and with reference to the accompanying drawings, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
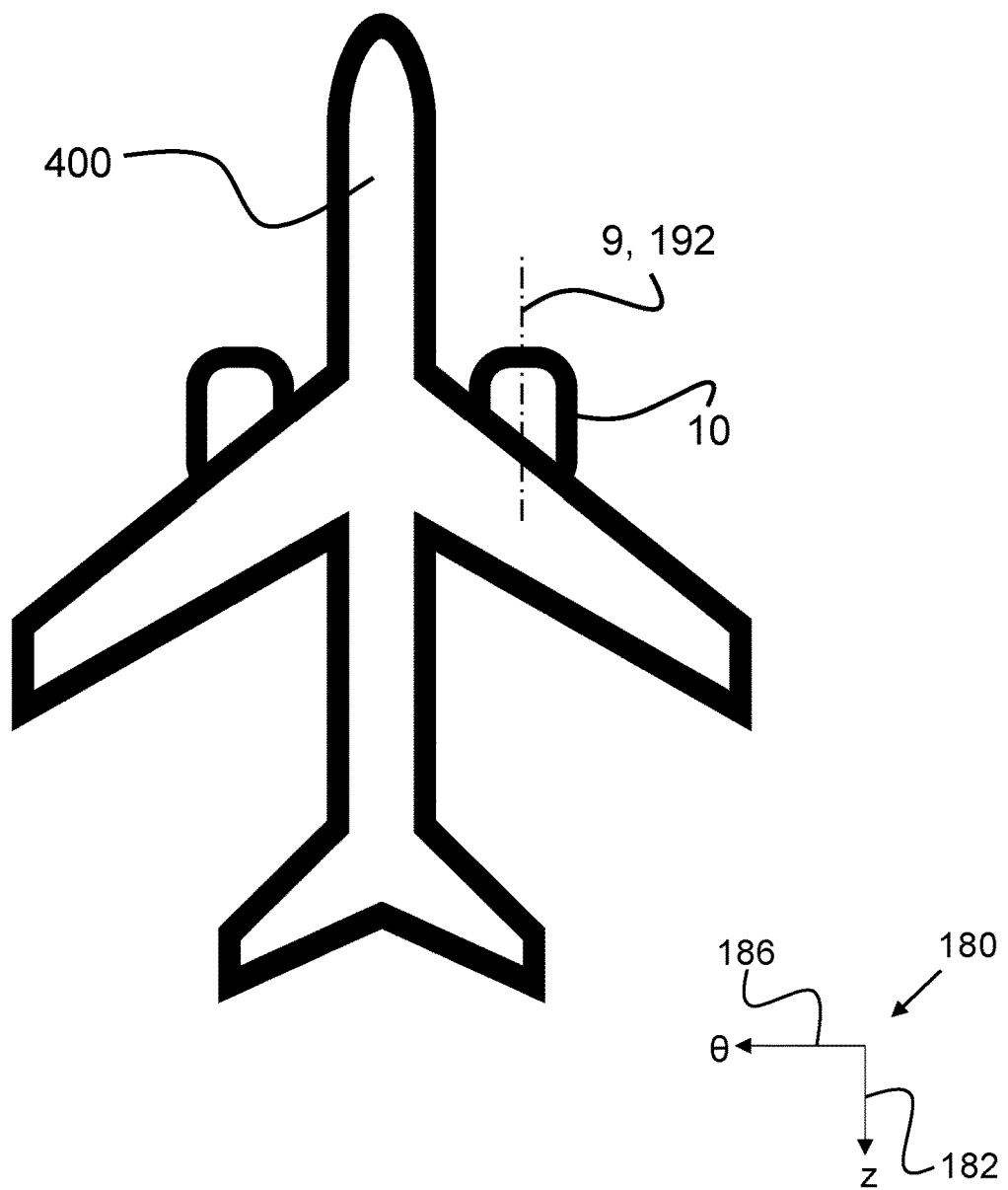
FIG. 1 is a plan view of an aircraft comprising a gas turbine engine.

FIG. 1 is a plan view of an aircraft 400 comprising a gas turbine engine 10. The gas turbine engine 10 may be a ducted fan gas turbine engine. The aircraft 400 may comprise any number of gas turbine engines 10.

Figure 2:
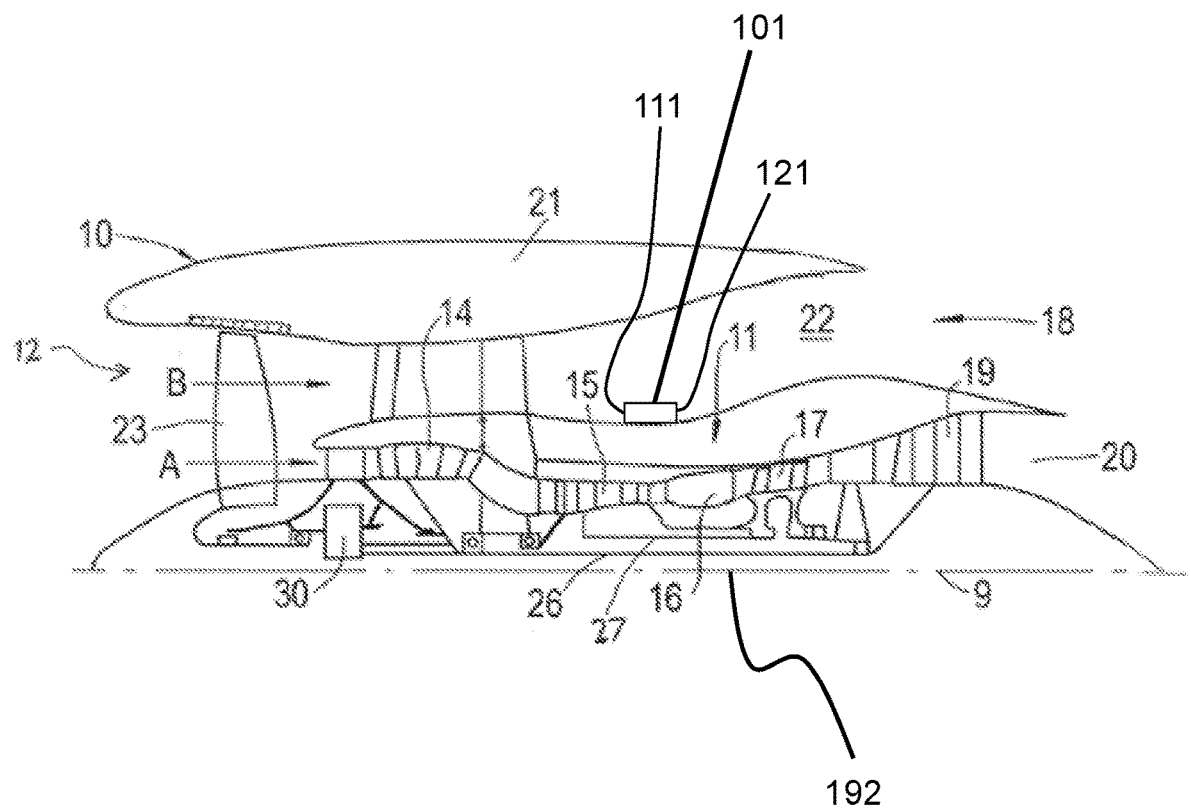
FIG. 2 is a cross-sectional sectional side view of a gas turbine engine comprising a heat exchanger assembly.
Figure 2:
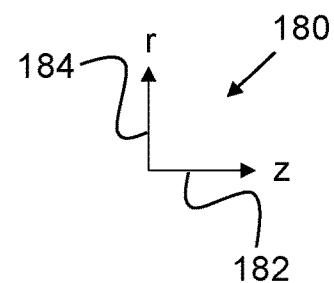

FIG. 2 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. The engine core 11 has a central axis 192 that is substantially aligned with the principal rotational axis 9. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

For clarity, FIGS. 1 to 3, 5 to 10, 13 and 14 each show directions of a cylindrical coordinate system 180 of the principal rotational axis 9 and of the central axis 192. The cylindrical coordinate system 180 includes an axial direction (denoted as z) 182, a radial direction (denoted as r) 184 and a tangential or circumferential direction (denoted as Θ) 186.

The terms axially, axial, radially, radial, circumferentially, circumferential, tangentially and tangential are defined with respect to the principal rotational axis 9 (and, thus, the central axis 192). The cylindrical coordinate system 180 is shown as being displaced away from the principal rotational axis 9 and the central axis 180 in the abovementioned Figures, however it will be appreciated that the cylindrical coordinate system 180 is centred on the principal rotational axis 9 and the central axis 192 (i.e. the axial direction 182 is aligned with the principal rotational axis 9).

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

The gas turbine engine 10 further comprises a heat exchanger assembly 101 disposed annularly around the core 11 and configured to transfer heat generated by the core 11 into the bypass air flow B. In particular, the heat exchanger assembly 101 is disposed radially outward of the core 11 and radially inward of a portion of the bypass duct 22. As shown, the heat exchanger assembly 101 comprises an inlet region opening 111 and an outlet region opening 121. The location of the heat exchanger assembly 101 in FIG. 2 is purely illustrative, and it will be appreciated that the heat exchanger assembly 101 may be disposed around the core 11 at any suitable location within the gas turbine engine 10.

Figure 3:
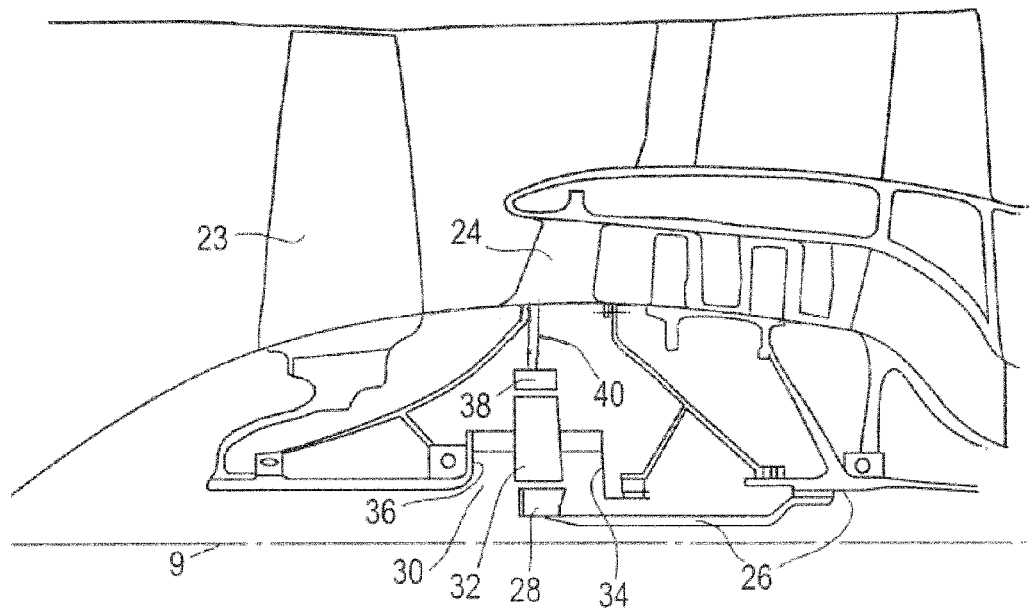
FIG. 3 is a close up sectional side view of an upstream portion of a gas turbine engine.
Figure 3:
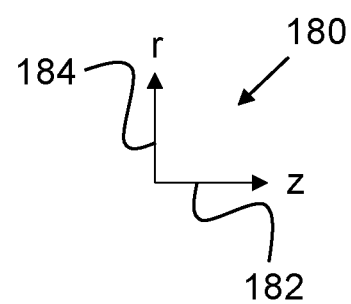

An exemplary arrangement for a geared fan gas turbine engine 10 is shown in FIG. 3. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 4:
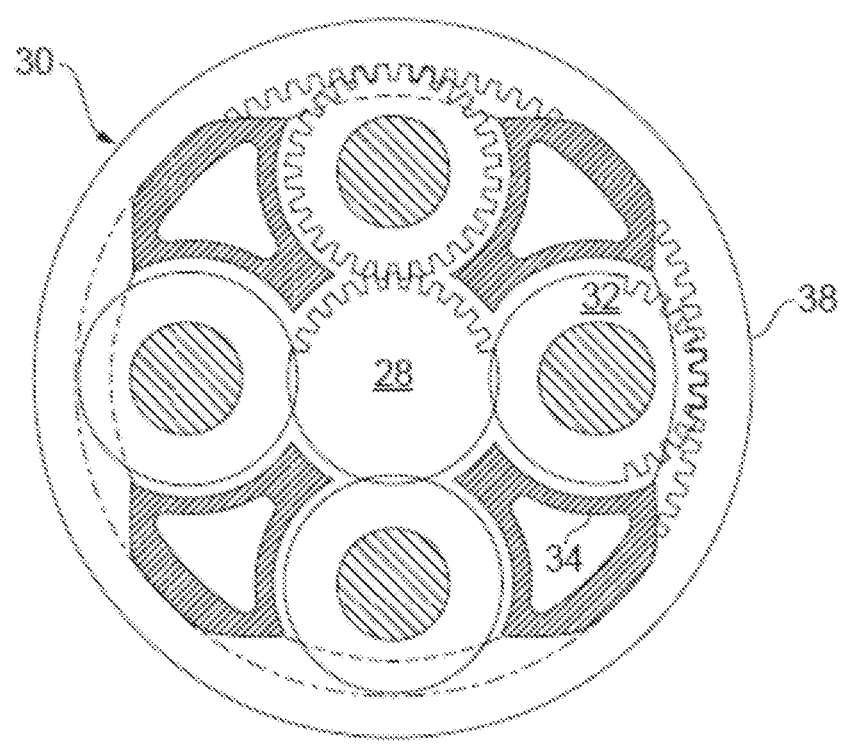
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 3 and 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 3 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

Figure 5:
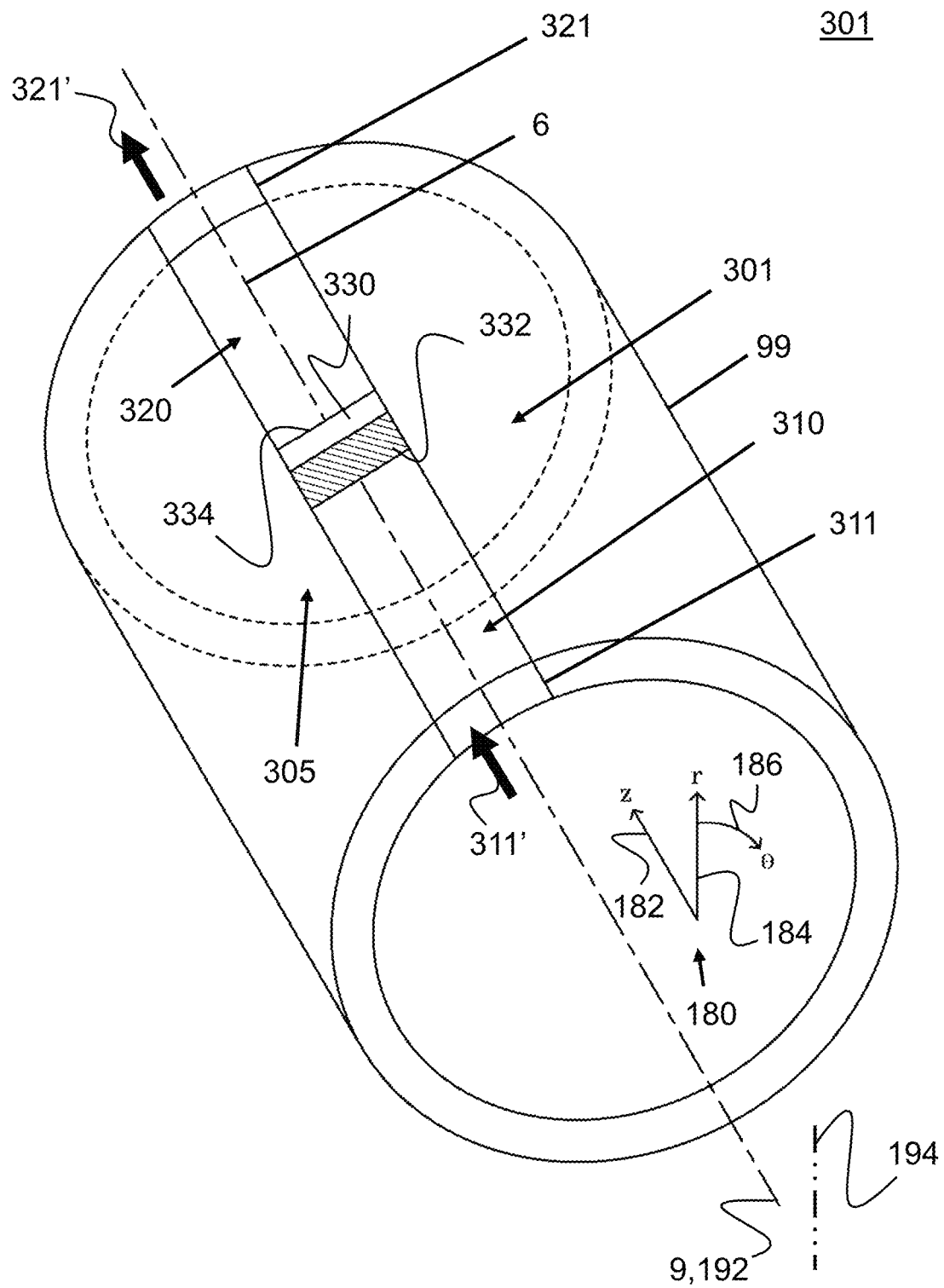
FIG. 5 is a perspective view of a conventional heat exchanger assembly.

FIG. 5 is a perspective view of a conventional heat exchanger assembly 301 not in accordance with the present disclosure. The heat exchanger assembly 301 is shown as being located within an annular housing 99, although this need not be the case. Hidden features (i.e. those not observable from the viewpoint of FIG. 5) are shown in dashed lines.

The conventional heat exchanger assembly 301 comprises a heat exchanger duct 305 and a heat exchanger 330. The heat exchanger duct 305 has an inlet region 310 and an outlet region 320. The heat exchanger 330 is disposed between the inlet region 310 and the outlet region 320. The heat exchanger duct 305 further comprises an inlet duct opening 311 and an outlet duct opening 321, both of which are in fluid communication with the bypass duct 22. The heat exchanger 330 comprises an inlet face 332, an outlet face 334 and an interior disposed between the inlet face 332 and the outlet face 334. The inlet face 332 and the outlet face 334 are axially offset from each other with respect to the axis 9. The centreline 6 of the heat exchanger duct 305 (i.e. the axis running along the midpoint of the heat exchanger duct 305) is coplanar with the axis 9. Accordingly, the heat exchanger duct 305 is linear and the direction of the centreline 6 of the heat exchanger duct 305 does not have a tangential component 186 (i.e. a component in direction Θ) or a circumferential component.

During operation, the inlet duct 310 receives a flow of air in a direction indicated by arrow 311' from the bypass duct 22 via the inlet duct opening 311. The flow of air passes along the inlet duct opening 311 to the inlet face 332 of the heat exchanger 330. The flow of air then passes through the interior of the heat exchanger 330, where it is heated by a process fluid, and exits the heat exchanger 330 via the outlet face 334. The flow of air then passes along the outlet region 320 and is discharged into the bypass duct 22 via the outlet duct opening 321 in a direction indicated by arrow 321'.

Figure 6:
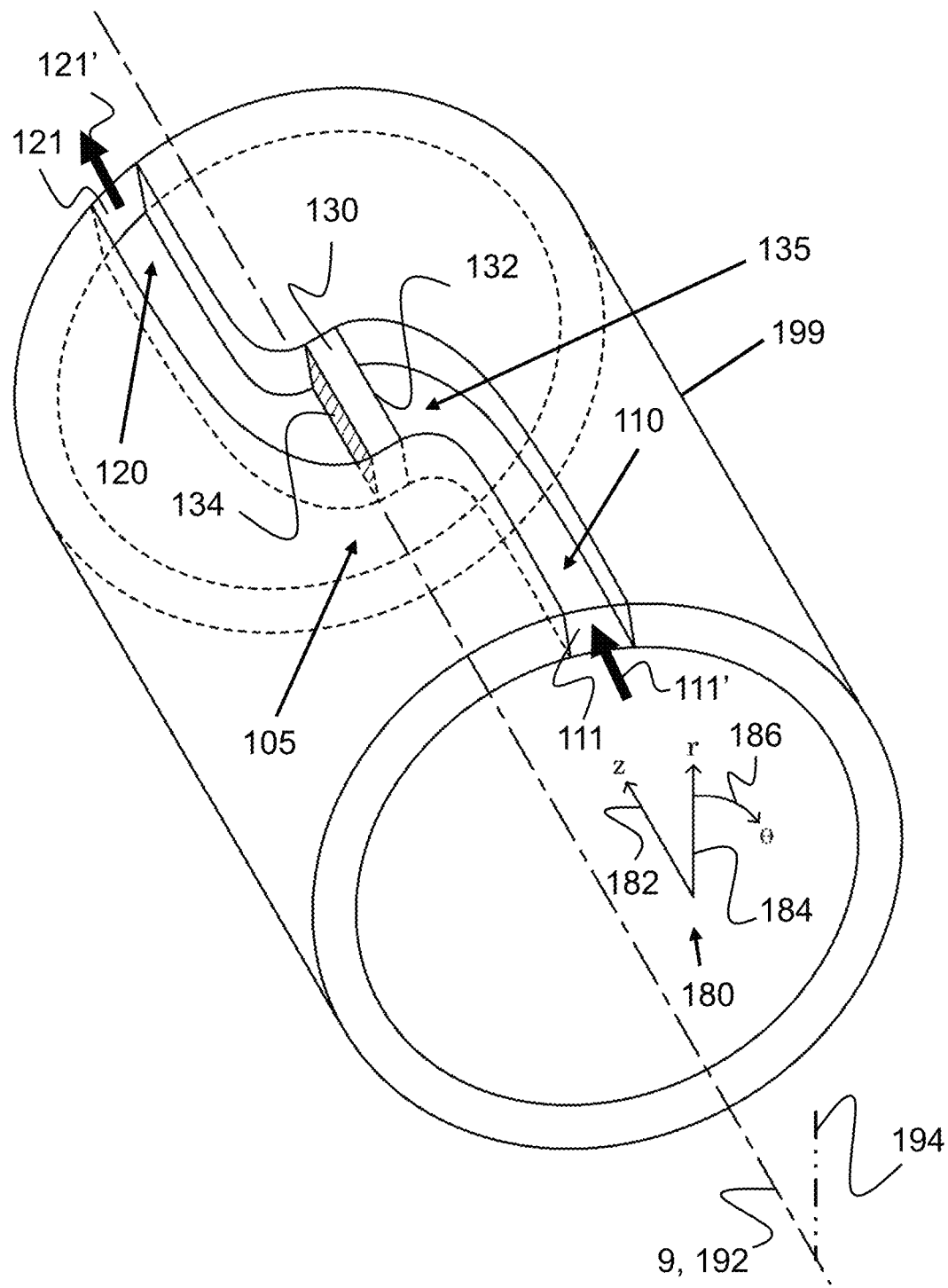
FIG. 6 is a perspective view of a first example heat exchanger assembly in accordance with the present disclosure.

FIG. 6 shows a perspective view of a first example heat exchanger assembly 101 in accordance with the present disclosure. The first example heat exchanger assembly 101 is shown as being located within an annular housing 199, although this need not be the case.

The first example heat exchanger assembly 101 comprises a heat exchanger duct 105 and a heat exchanger 130. The heat exchanger duct 105 has an inlet region 110, an inflection region 135 and an outlet region 120. The heat exchanger 130 is disposed within the inflection region 135. The heat exchanger duct 105 further comprises an inlet region opening 111 and an outlet region opening 121, both of which are in fluid communication with the bypass duct 22. The heat exchanger 130 comprises an inlet face 132, an outlet face 134 and an interior disposed between the inlet face 132 and the outlet face 134. The inlet face 132 and the outlet face 134 are offset from each other in a tangential direction with respect to the axis 9. The heat exchanger 130 is fluidically connected to an external fluid circuit disposed within the core 11 of the gas turbine engine 10.

During operation, the inlet region 110 receives a flow of air in a direction indicated by arrow 111' from the bypass duct 22 via the inlet duct opening 111. The inlet region opening 111 is oriented with respect to a ducted fan of the gas turbine engine 10 so as to optimise air entry from the bypass duct 22 of the gas turbine engine 10 into the inlet region 110 of the heat exchanger assembly 101. The flow of air passes along the inlet region 110, passes along a portion of the inflection region 135 upstream of the heat exchanger 130, and passes to the inlet face 132 of the heat exchanger 130. Process fluid passing through the external fluid circuit is heated and conveyed to the heat exchanger 130. The process fluid may be lubricating oil for a bearing chamber or a gearbox of the core 11, or a coolant for cooling an electrical generator, a motor, a power electronics device or another heat generating device within the core 11 of the gas turbine engine 10. The flow of air within the heat exchanger duct 105 passes through the interior of the heat exchanger 130 and is heated by the process fluid, thereby cooling the process fluid, which returns to the remainder of the external fluid circuit. Accordingly, the heat exchanger 130 is configured to transfer heat generated by the core 11 of the gas turbine engine 10 into the flow of air as it passes through the inflection region 135. The flow of air then passes along a portion of the inflection region 135 downstream of the heat exchanger 130, passes along the outlet region 120 and is discharged into the bypass duct 22 via the outlet duct opening 121 in the direction indicated by arrow 121'. Accordingly, the inflection region 135 is configured to transfer the flow of air from the inlet region 110 to the outlet region 120 and the heat exchanger duct 105 is configured to convey the flow of air from the inlet region opening 111 to the outlet region opening 121 via the heat exchanger 130.

Figure 7:
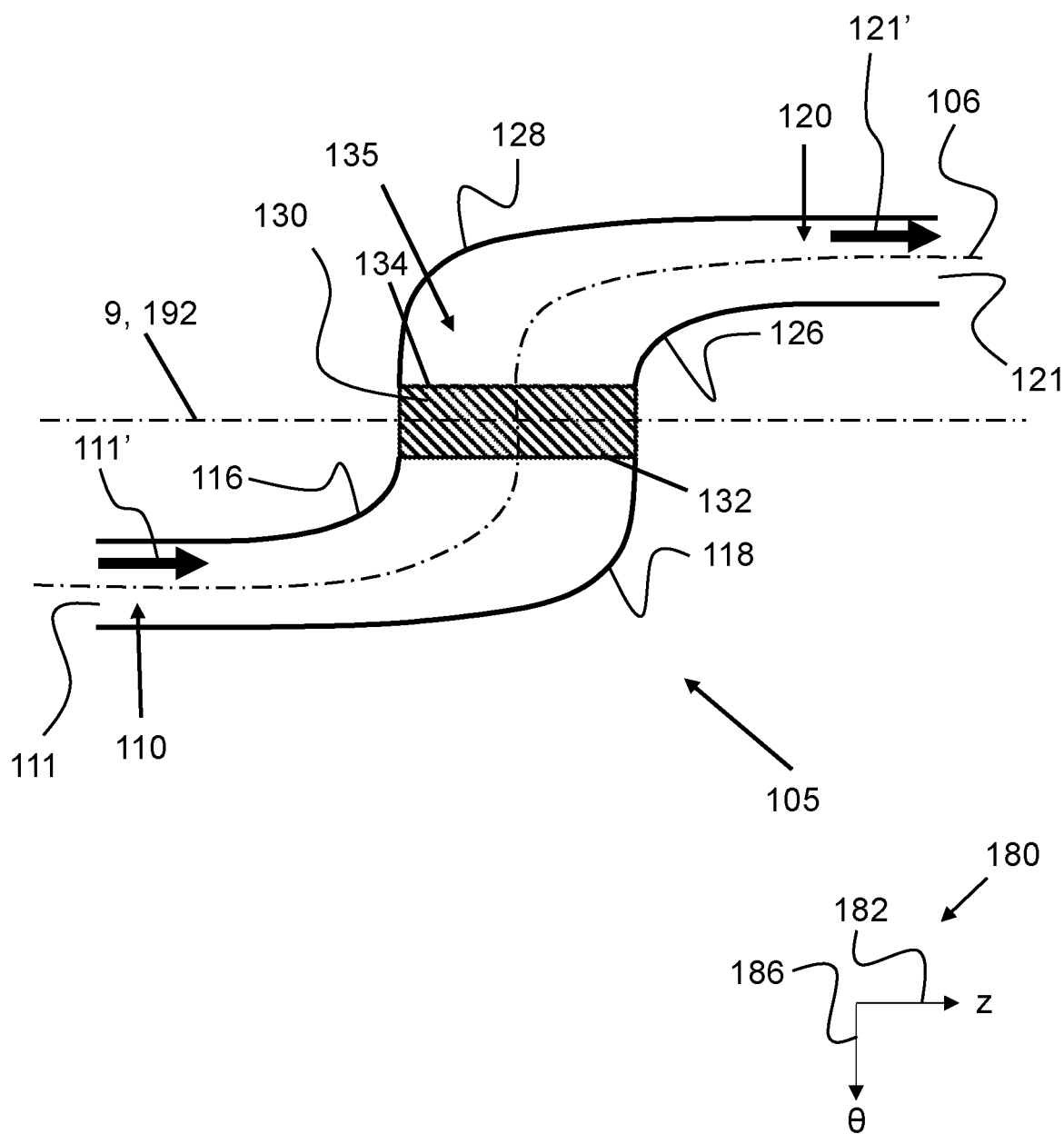
FIG. 7 is a cross-sectional schematic plan view of the first example heat exchanger assembly.

FIG. 7 is a cross-sectional schematic plan view of the first example heat exchanger 101 assembly shown in FIG. 6 through a plane concentric to the axes 9, 192.

As shown, the heat exchanger duct 105 changes direction between the inlet region 110 and the inflection region 135, and between the inflection region 135 and the outlet region 120. Accordingly, the direction of the centreline 106 of the heat exchanger duct 105 (i.e. the axis running along the midpoint of the heat exchanger duct 105) has a tangential component (i.e. a component in the direction Θ 186) with respect to the axis 9, and, thus, a circumferential component. In addition, the centreline 106 of the heat exchanger duct 105 is substantially curved within or along the inflection region 135 and has a curvature which changes sign within the inflection region 135. Accordingly, the centreline 106 of the heat exchanger duct 105 inflects within the inflection region 135. The heat exchanger duct 105 is therefore substantially serpentine.

The centreline 106 of the heat exchanger duct 105 is disposed on a single concentric plane extending around the axis 9. Accordingly, the direction of the centreline 106 of the heat exchanger duct 105 does not have a radial component with respect to the axis 9 (i.e. a component in the direction r 184). However, in alternative arrangements this need not necessarily be the case.

The inlet region opening 111 is disposed at a first circumferential position about the axis 9 and the outlet region opening 121 is disposed at a second circumferential position 121 about the axis 9. The first circumferential position is different to the second circumferential position. In the arrangement shown in FIG. 7, the inlet region 110 and the outlet region 120 are circumferentially offset with respect to the axis 9 (i.e. offset in a tangential direction) such that the inlet region 110 and the outlet region 120 do not circumferentially overlap with respect to the axis 9. However, in alternative arrangements the inlet region 110 and the outlet region 120 are circumferentially offset while also circumferentially overlapping.

The centreline 106 of the heat exchanger duct 105 at the inlet region 110 and the centreline 106 of the heat exchanger duct 105 at the outlet region 120 are each substantially coplanar with the axis 9 and substantially mutually parallel.

The cross-sectional area of the heat exchanger duct 105 defined on a plane perpendicular to the centreline 106 at the inflection region 135 is greater than the cross-sectional area of the heat exchanger duct 105 defined on a plane perpendicular to the centreline 106 of the heat exchanger duct 105 at the inlet region 110 and the cross-sectional area of the heat exchanger duct 105 defined on a plane perpendicular to the centreline 106 of the heat exchanger duct 105 at the outlet region 120.

The inlet face 132 and the outlet face 134 of the heat exchanger are offset with respect to each other so as to define the interior portion of the heat exchanger 130. The inlet face 132 and the outlet face 134 are offset in a tangential direction with respect to the axis 9, and, thus, are circumferentially offset. The inlet face 132 and the outlet face 134 are substantially coplanar with the axis 9. Accordingly, the heat exchanger 130 is aligned with the axis 9.

The inflection region 135 upstream of the heat exchanger 130 is defined by a first convex surface 116 and a first concave surface 118. The inflection region 135 downstream of the heat exchanger 130 is defined by a second convex surface 126 and a second concave surface 128. The first convex surface 116 and the first concave surface 118 are offset in a tangential direction with respect to the axis 9 and, thus, are circumferentially offset. Likewise, the second convex surface 126 and the second concave surface 128 are offset in a tangential direction with respect to the axis 9, and, thus, are circumferentially offset.

The geometry of the heat exchanger duct 105, including the inlet region 110, the inflection region 135, the outlet region 135, the first and second convex wall surfaces 116, 126 and the first and second concave wall surface 118, 128, ensures that a velocity profile of the flow of air conveyed by the inlet region 110 is diffused (i.e. linearised) prior to the flow of air passing through the interior portion of the heat exchanger 130. A linearised velocity profile of the flow of air through the interior portion of the heat exchanger 130 provides more uniform and more optimised convective cooling of the flow of process fluid within the heat exchanger 130.

By providing a heat exchanger assembly 101 having a heat exchanger duct 105 with an inlet region 110, an outlet region 120 and an inflection region 135, in which the heat exchanger duct 105 has centreline 106 with a tangential component and in which a heat exchanger assembly 101 is disposed within the inflection region 135, a relatively large heat exchanger 130 (i.e. a heat exchanger having a relatively large cooling capacity) can be provided without the heat exchanger duct 105 having to occupy a large circumferential or radial footprint within the gas turbine engine 10. This reduces cost and weight, provides additional space for other components, improves performance and allows more heat exchangers to be provided in a single gas turbine engine 10, for example.

Figure 8:
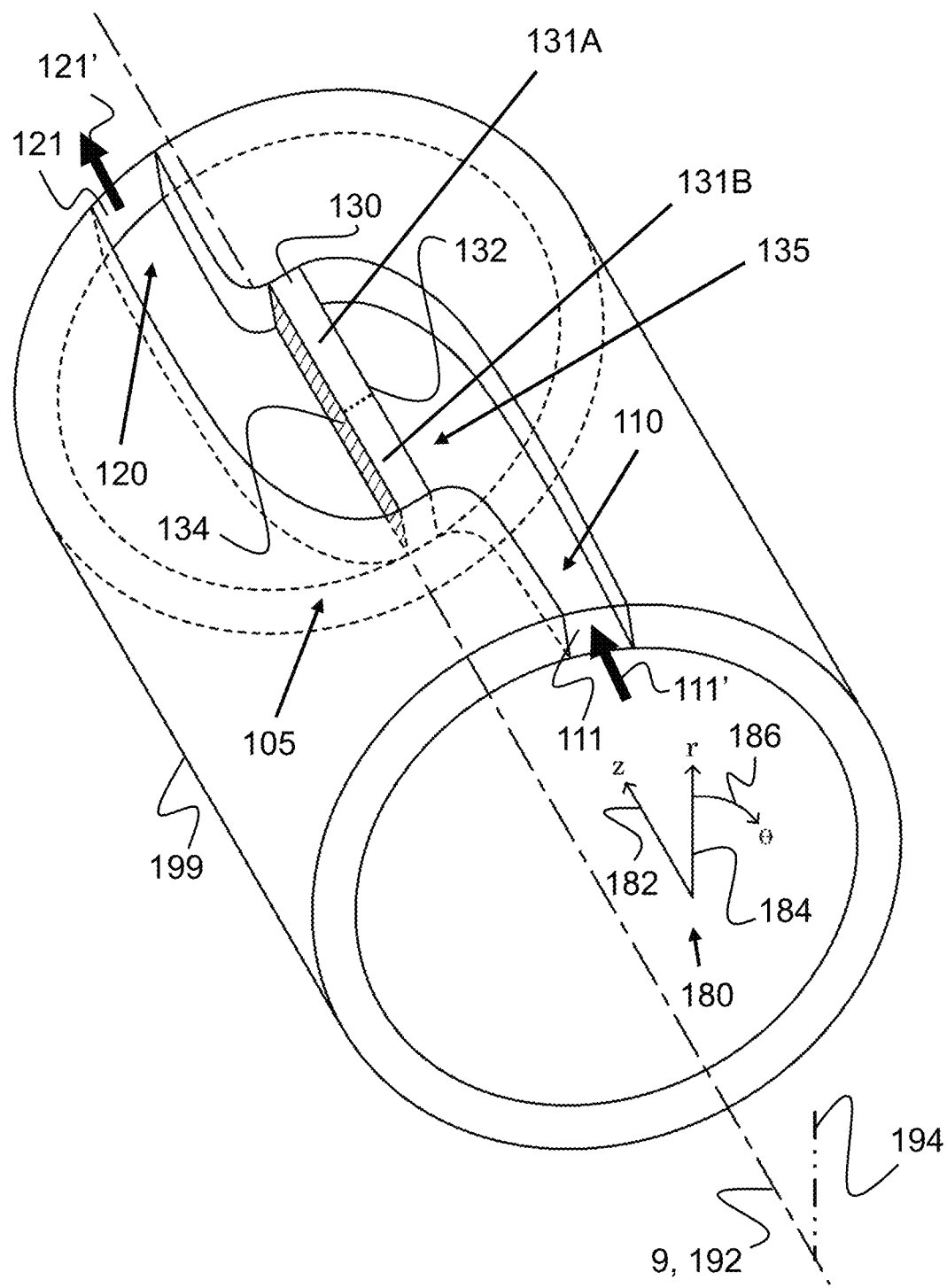
FIG. 8 is a perspective view of a second example heat exchanger assembly in accordance with the present disclosure.

FIG. 8 shows a perspective view of a second example heat exchanger assembly 102. The second example heat exchanger assembly 102 is substantially identical in form and function to the first example heat exchanger assembly 101, with like reference numerals indicating common or similar features. However, the second example heat exchanger assembly 102 differs from the first example heat exchanger assembly 101 insofar as the length of the heat exchanger 130 of the second example heat exchanger assembly 102 is greater than the length of the heat exchanger 130 of the first example heat exchanger assembly 101. The heat exchanger duct 105 at the inflection region 135 has a greater axial dimension to accommodate the elongate heat exchanger 130.

The elongate heat exchanger 130 of the second example heat exchanger assembly 102 may comprise a plurality of distinct fluid circuits 131A, 131B, rather than a single fluid circuit. For example, the elongate heat exchanger 130 may comprise one or more internal partitions for separating the elongate heat exchanger 130 into a plurality of distinct sections through which distinct flows of process fluid may be provided by respective (i.e. separate) external fluid circuits. This allows a single heat exchanger 130 to be shared by a plurality of external fluid circuits.

In such examples, the need for additional heat exchanger assemblies to cater for the plurality of flows of process fluid is eliminated, which provides simpler means for cooling the flows of process fluid within the gas turbine engine 10. Each heat exchanger assembly 102 is associated with a pressure drop within the bypass duct 22 between the inlet region opening 111 and the outlet region opening 121. Accordingly, the configuration of FIG. 8 may provide a lower total pressure drop within the bypass duct 22 than would otherwise be present with the inclusion of a plurality of distinct heat exchanger assemblies.

The configuration of such a heat exchanger assembly 102 also allows a plurality of flows of process fluid to be cooled within the heat exchanger 130 without requiring mixing of the plurality of flows prior to being conveyed through the heat exchanger 130. Consequently, each of the plurality of flows of process fluid may comprise different types of process fluid which are not suitable for mixing within the heat exchanger 130.

Figure 9:
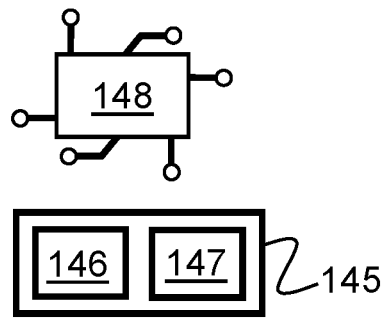
FIG. 9 is a cross-sectional schematic plan view of a third example heat exchanger assembly in accordance with the present disclosure in a first configuration.
Figure 9:
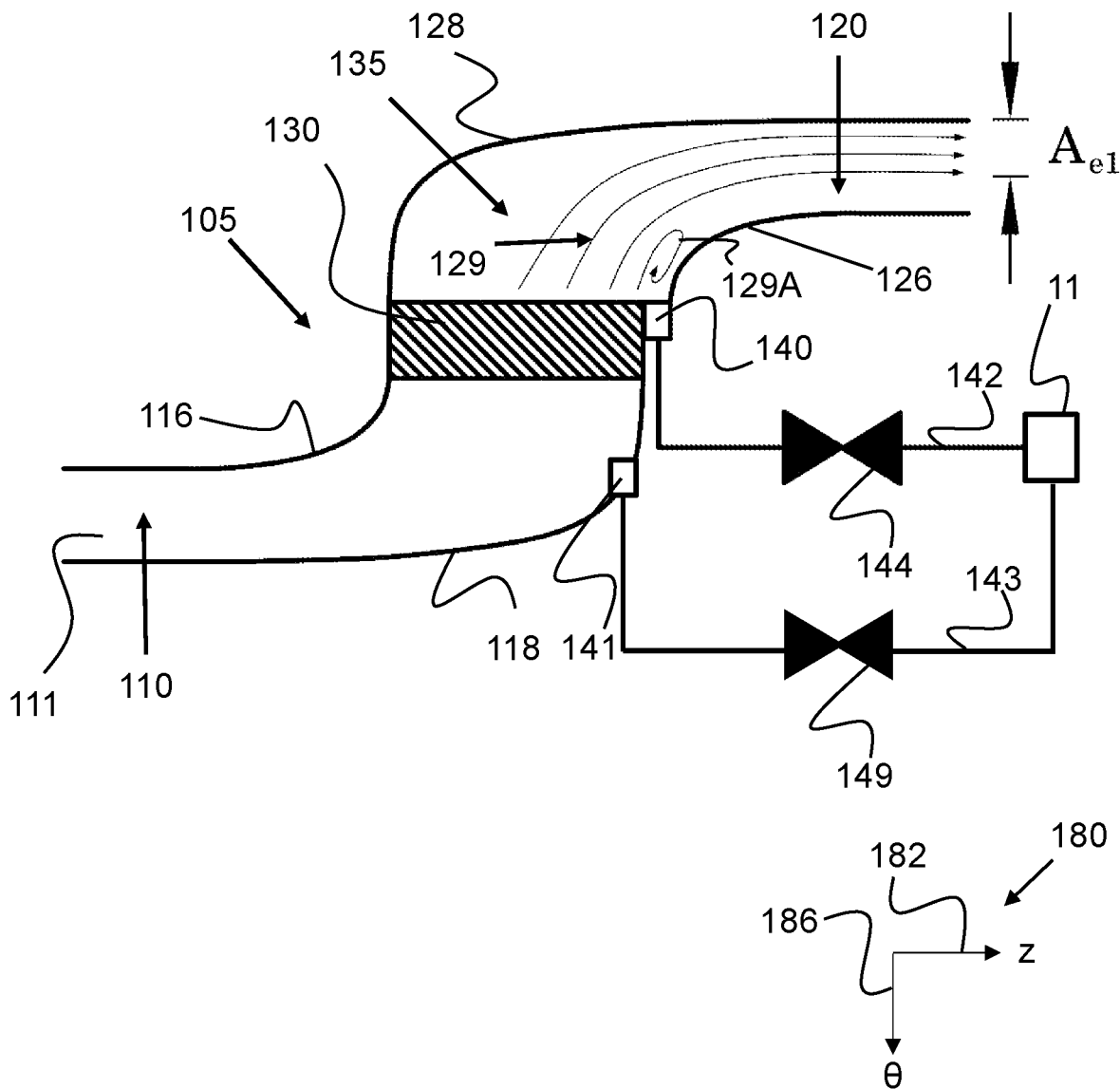

FIG. 9 is a cross-sectional schematic plan view of a third example heat exchanger assembly 103 through a plane concentric to the axis 9 in a normal air supply mode. The third example heat exchanger assembly 103 is substantially identical in form and function to the first example heat exchanger assembly 101, with like reference numerals denoting common or similar features.

The third example heat exchanger assembly 103 differs from the first example heat exchanger assembly 101 in that it comprises a supplementary air supply opening 140 positioned downstream of the heat exchanger 130 at or adjacent to the second convex surface 126 and an additional air supply opening 141 positioned upstream of the heat exchanger 130 at or adjacent to the first concave surface 118. The supplementary air supply opening 140 is fluidically connected to a supply of fluid from the core 11 of the gas turbine engine 10 via a supplementary air supply line 142. The additional air supply opening 141 is fluidically connected to a supply of fluid from the core 11 of the gas turbine engine 10 via an additional air supply line 143. A supplementary air control valve 144 is disposed along the supplementary air supply line 142 for modifying a flow rate of the supplementary flow of air. An additional air control valve 149 is disposed along the additional air supply line 143 for modifying a flow rate of the additional flow of air.

It will be appreciated that in other examples, the supplementary air supply opening 140 and/or the additional air supply opening 141 may be configured to receive their respective flows of air from another source, such as a cabin blower compressor or an auxiliary air supply. In other configurations, the sources of air may be different for each of the supplementary air supply opening 140 and/or the additional air supply opening 141.

As mentioned above, the heat exchanger assembly 101 is associated with a pressure drop within the bypass duct 22 between the inlet region opening 111 and the outlet region opening 121. In order for the flow of air to be conveyed through the heat exchanger assembly 101, the pressure of air within the bypass duct 22 upstream of the inlet region opening 111 must be sufficiently large so as to be able to overcome the pressure drop between the inlet region opening 111 and the outlet region opening 121. The pressure drop is dependent on, among other things, an effective exit area of the flow of air being conveyed by the outlet region 120 through the outlet region opening 121 and into the bypass duct 22 of the gas turbine engine 10. The effective exit area may be regarded as an area through which the flow of air is laminar. A smaller effective exit area is associated with an increased pressure drop, whereas a larger effective exit area is associated with a decreased pressure drop.

In the normal air supply mode shown in FIG. 9, the supplementary air control valve 144 is closed and the supplementary flow of air is not provided to the supplementary air supply opening 140 or to the additional air supply opening 141. For illustrative purposes only, FIG. 9 shows a plurality of streamlines 129 approximating the flow of air within the inflection region 135 and the outlet duct 120 in the normal air supply mode (corresponding streamlines also exist upstream of the heat exchanger 130, but are not shown).

As the flow of air passes from the heat exchanger 130 through the inflection region 135, an adverse pressure gradient tends to develop on a region proximal to the second convex surface 126. The adverse pressure gradient results in internal flow separation with respect to the second convex surface 126, which in turn leads to the development of a region of recirculating flow as shown by streamline 129A. The size of the region of recirculating flow 129A reduces the effective exit area $A_{e1}$ and therefore adversely increases the pressure drop between the inlet region opening 111 and the outlet region opening 121.

Figure 10:
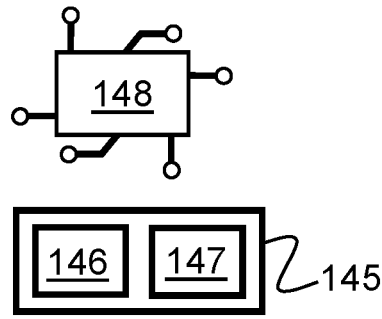
FIG. 10 is a cross-sectional schematic plan view of a third example heat exchanger assembly in a second configuration.
Figure 10:
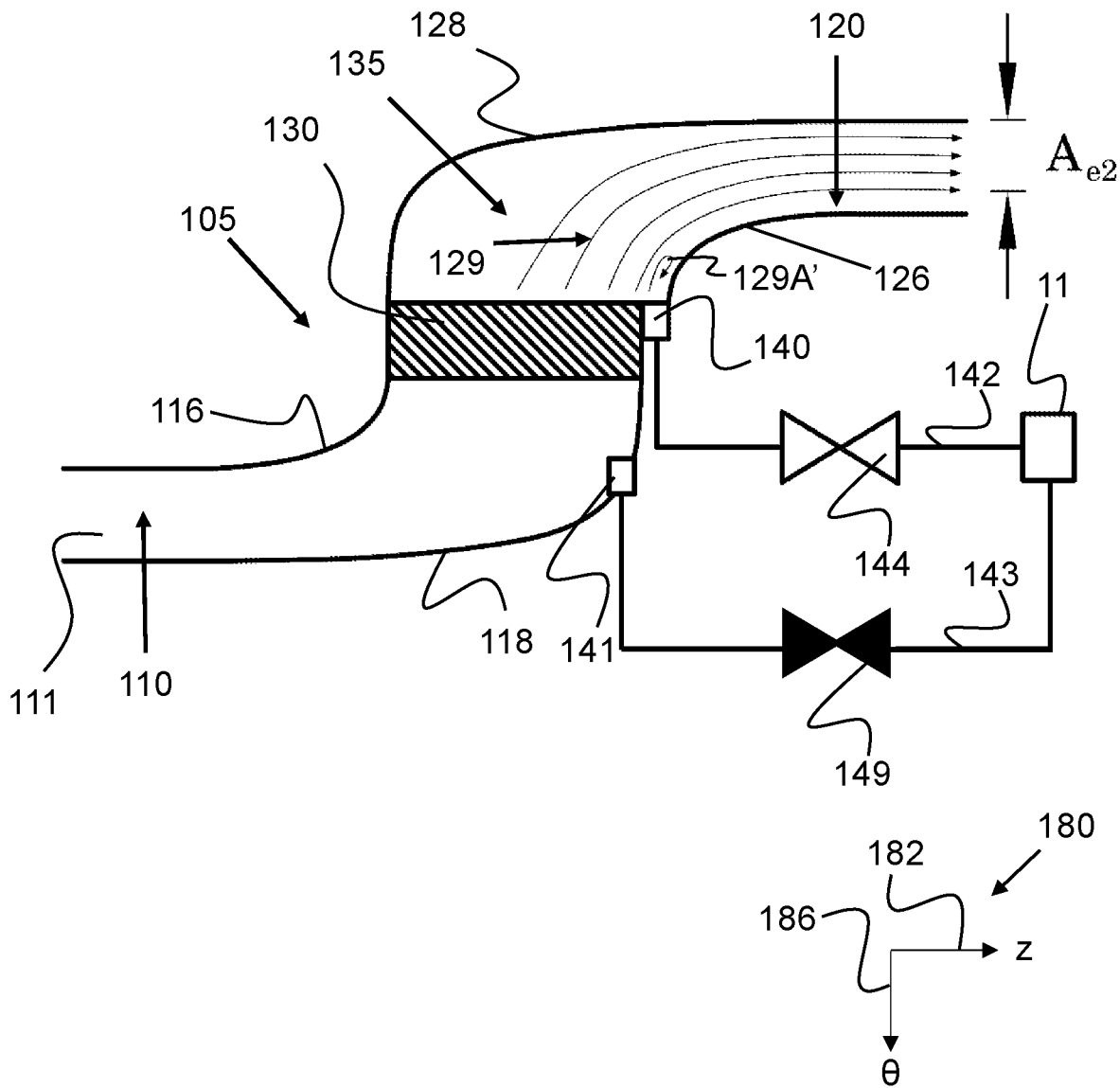

FIG. 10 shows the third example heat exchanger assembly 103 in a supplementary air supply mode. In the supplementary air supply mode, the supplementary air control valve 144 is at least partially open and the supplementary flow of air is directed into the outlet duct 120 and onto or near the second convex surface 126 of the inflection region 135.

Due to the positioning of the supplementary air supply opening 140, the supplementary air control valve 144 directs the supplementary flow of air onto or near the second convex surface 126. Consequently, the supplementary flow of air has a tendency to attach to the second convex surface 126 as a result of the Coandă effect. Accordingly, the supplementary flow of air discourages internal flow separation with respect to the second convex surface 126, which reduces the size of a region of recirculating flow approximated by streamline 129A'. The reduced size of the region of recirculating flow 129A' increases the effective exit area $A_{e2}$ in the supplementary air supply mode compared to the effective exit area $A_{e1}$ in the normal air supply mode and therefore decreases the pressure drop between the inlet region opening 111 and the outlet region opening 121 in the supplementary air supply mode compared to the normal air supply mode.

The decreased pressure drop in the supplementary air supply mode has the effect of promoting the airflow through the heat exchanger assembly 103, and so a mass flow rate of the flow of air from the bypass duct 22 through the heat exchanger assembly 103 (and therefore through the heat exchanger 130) may be greater in the supplementary air supply mode than in the normal air supply mode, which in turn increases a rate of convective heat transfer between the flow of air and the or each flow of process fluid within the heat exchanger 130. In other words, a rate of cooling of the or each flow of process fluid within the heat exchanger 130 is higher in the supplementary air supply mode than in the normal air supply mode.

Further, the rate of cooling of the or each flow of process fluid within the heat exchanger 130 in the supplementary air supply mode may be modulated by controlling the mass flow rate of the supplementary flow of air. Increasing the mass flow rate of the supplementary flow of air increases the strength of the Coandă effect adjacent to the second convex surface 126, thereby discouraging internal flow separation with respect to the second convex surface 126. Accordingly, an increased mass flow rate of the outlet supplementary flow of air is associated with an increased effective exit area $A_{e2}$ and a reduced pressure drop in the supplementary air supply mode, thereby increasing the rate of cooling of the or each flow of process fluid within the heat exchanger 130.

In the example of FIGS. 9 and 10, the third example heat exchanger assembly 102 comprises a sensor arrangement 145 and a controller 148 in communication with the sensor arrangement 145 and the supplementary air control valve 144. In the illustrated examples, the sensor arrangement 145 comprises a process fluid temperature sensor 146 and a bypass duct pressure sensor 147. However, it will be appreciated that in other examples, the sensor arrangement 145 may comprise only a process fluid temperature sensor 146 or a bypass duct pressure sensor 147.

The process fluid temperature sensor 146 is configured to generate a signal indicative of a temperature of the process fluid within the heat exchanger 130 or within the at least one external fluid circuit. Preferably, the process fluid temperature sensor 146 may be configured to generate a signal indicative of a temperature of the process fluid as it exits the heat exchanger 130. The bypass duct pressure sensor 147 is configured to generate a signal indicative of a pressure of air within the bypass duct 22 of the gas turbine engine 10 (e.g. a pressure upstream of the inlet duct opening).

The controller 148 is configured to control a state of the supplementary air control valve 144 based on the signal generated by the process fluid temperature sensor 146 and/or the bypass duct pressure sensor 147 in accordance with a method 900, and thereby control the mass flow rate of the supplementary flow of air based on the signal generated by the process fluid temperature sensor 146 and/or the signal generated by the bypass duct pressure sensor 147.

Figure 11:
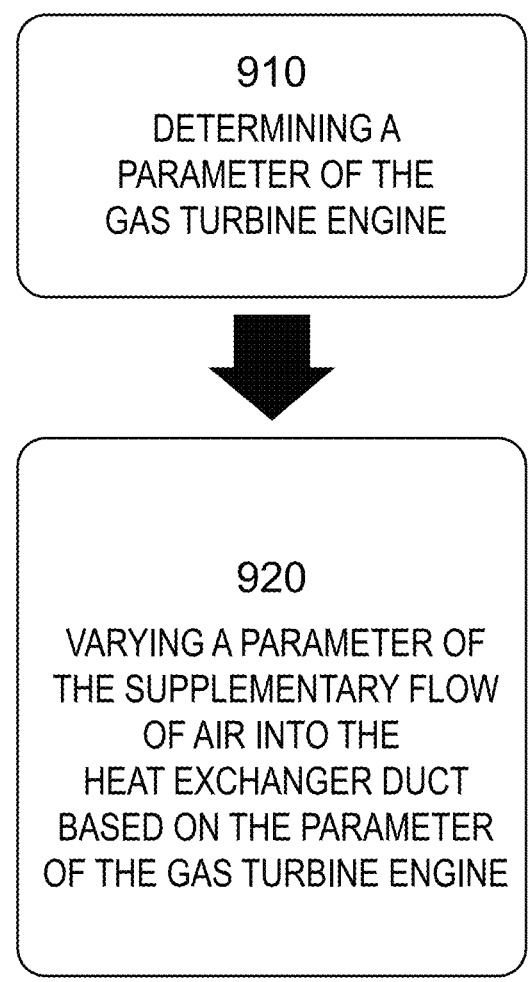
FIG. 11 is a flowchart of a first method of operating the third example heat exchanger assembly.

FIG. 11 is a flowchart of a such a first method 900 of operating the third example heat exchanger assembly 103.

In a first step 910 of the first method 900, a parameter of the gas turbine engine 10 is determined. In a second step 920 of the first method 900, a parameter of the supplementary flow of air into the heat exchanger duct 105 is varied based on the parameter of the gas turbine engine 10. The parameter of the gas turbine engine 10 may be a pressure of the flow of air within the bypass duct of the gas turbine engine 10 and/or the temperature of a process fluid exiting the heat exchanger 130. The parameter of the supplementary flow of air may be a flow rate of the supplementary flow of air into the heat exchanger duct 105.

The pressure of the flow of air within the bypass duct 22 may be determined by the controller 148 based on a signal received from the bypass duct pressure sensor 147 indicative of a pressure of air within the bypass duct 22 of the gas turbine engine 10 upstream of the inlet duct opening. The temperature of the process fluid exiting the heat exchanger 130 may be determined by the controller 148 based on a signal received from the process fluid temperature sensor 146 indicative of a temperature of the process fluid within the heat exchanger 130 or within the at least one external fluid circuit.

By way of a first example of the method 900, the controller 148 may be configured to open the supplementary air control valve 144 in response to a determination that the temperature of the process fluid is greater than an upper temperature threshold, and thereby place the heat exchanger assembly 103 in the supplementary air supply mode. As mentioned above, this has the effect of promoting the airflow through the heat exchanger assembly 103, which increases a rate of convective heat transfer between the flow of air and the or each flow of process fluid within the heat exchanger 130.

Conversely, the controller 148 may be configured to close the supplementary air control valve 144 in response to a determination that the temperature of the process fluid is lower than a lower temperature threshold, and thereby place the heat exchanger assembly 103 in the normal air supply mode. This has the effect of reducing the airflow through the heat exchanger assembly 103, which reduces a rate of convective heat transfer between the flow of air and the or each flow of process fluid within the heat exchanger 130.

In this manner, the controller is configured to maintain a temperature of the process fluid within the heat exchanger 130 or within the or each external fluid circuit between the lower temperature threshold and the upper temperature threshold. The lower temperature threshold and/or the upper temperature threshold may be chosen based on a cooling requirement of the component or components with which the external fluid circuit or circuits are associated.

By way of a second example of the method 900, the controller 148 may be configured to open the supplementary air control valve 144 in response to a determination that the pressure of air within the bypass duct 22 is lower than a lower pressure threshold and thereby place the heat exchanger assembly 103 in the supplementary air supply mode. This has the effect of increasing the pressure of air within the bypass duct 22 and promoting the airflow through the heat exchanger assembly 103, which increases a rate of convective heat transfer between the flow of air and the or each flow of process fluid within the heat exchanger 130.

Conversely, the controller 148 may be configured to close the supplementary air control valve 144 in response to a determination that the pressure of air within the bypass duct 22 is greater than an upper pressure threshold and thereby place the heat exchanger assembly 103 in the normal air supply mode. This has the effect of reducing the pressure of air within the bypass duct 22 and reducing the airflow through the heat exchanger assembly 103, which reduces a rate of convective heat transfer between the flow of air and the or each flow of process fluid within the heat exchanger 130.

The upper pressure threshold and/or the lower pressure threshold may be chosen based on a driving pressure requirement of the heat exchanger assembly 103. The driving pressure requirement may be related to the pressure drop between the inlet region opening 111 and the outlet region opening 121.

For example, it may be that when the gas turbine engine 10 is stationary (that is, when the gas turbine engine 10 has no forward speed) and/or when a ducted fan of the gas turbine engine 10 only causes a small pressure difference between air in the bypass duct 22 and ambient air, the pressure of air within the bypass duct 22 is not sufficiently high so as to adequately drive the flow of air through the heat exchanger assembly 103 due to the pressure drop (that is, the driving pressure requirement) associated with the heat exchanger assembly 103. Placing the heat exchanger assembly 103 in the supplementary air supply mode reduces the pressure drop associated with the heat exchanger assembly 103, which promotes airflow through the heat exchanger assembly 103 (and thereby promotes cooling of the or each flow of process fluid within the heat exchanger 130) even when the pressure of air within the bypass duct 22 is low. On the other hand, when the pressure of air within the bypass duct 22 is high, the heat exchanger assembly 103 may be placed in the normal air supply mode since the pressure of air within the bypass duct 22 is sufficiently high so as to adequately drive the flow of air through the heat exchanger assembly 103 without requiring the supplementary flow or air to be provided through the supplementary air supply line 142.

The additional air supply opening 141 may instead be utilised to supply the additional flow of air to the heat exchanger duct 105 in the supplementary air supply mode instead of or in addition to the supplementary air supply opening 140.

Figure 12:
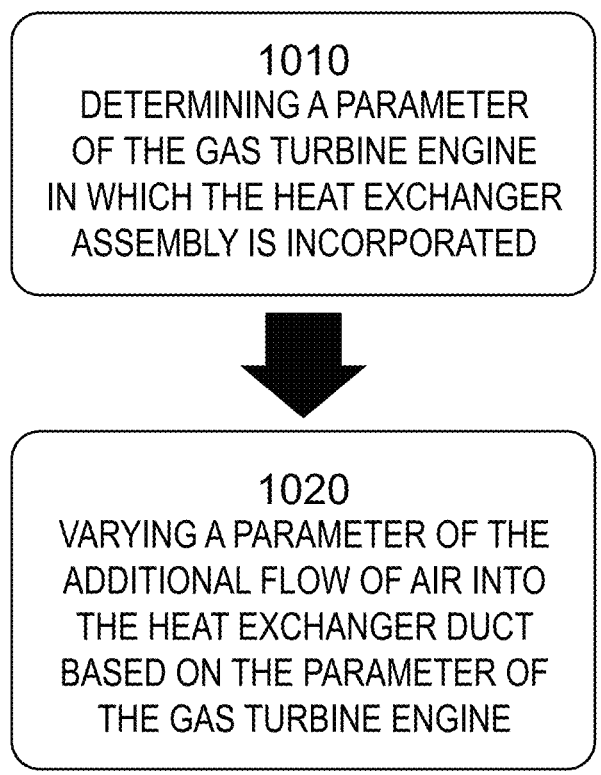
FIG. 12 is a flowchart of a second method of operating the third example heat exchanger assembly.

FIG. 12 is a flowchart of a second method 1000 of operating the third example heat exchanger assembly 103.

In a first step 1010 of the method 1000, a parameter of the gas turbine engine 10 in which the heat exchanger assembly 103 is incorporated is determined. In a second step 1020 of the method 1000, a parameter of the additional flow of air into the heat exchanger duct 105 is varied based on the parameter of the gas turbine engine 10. The parameter of the gas turbine engine 10 may be a pressure of the flow of air within a bypass duct 22 of the gas turbine engine 10 and/or a temperature of a process fluid exiting the heat exchanger 130. The parameter of the additional flow of air may be a flow rate of the additional flow of air into the heat exchanger duct 105 and/or the temperature of the additional flow of air into the heat exchanger duct 105.

The flow rate of the additional flow of air into the heat exchanger duct 105 may be varied, for example, by the controller 148 opening or closing the additional air control valve 149. The additional air supply opening 141 is configured to supply an additional flow of air into the heat exchanger duct 105 and onto or adjacent the second concave surface 118 of the inflection region 135.

The temperature of the additional flow of air into the heat exchanger duct 105 may be varied, for example, by the controller 148 controlling the composition of the additional flow of air. For example, in order to provide a relatively hot additional flow of air into the heat exchanger duct 105, the controller 148 could control the core 11 to supply the further supplementary air supply line 143 with an additional flow of air originating from a relatively hot part of the core 11 (e.g. a compressor). Further, in order to provide a relatively cool additional flow of air into the heat exchanger duct 105, the controller 148 could control the core 11 to supply the further supplementary air supply line 143 with an additional flow of air originating from a relatively cool part of the core 11.

By way of example of the second method 1010, the controller 148 may be configured to supply the additional air supply opening 141 with a relatively hot supply of air (or a relatively large flow rate of the relatively hot supply of air) when the temperature of the process fluid exiting the heat exchanger 130 is lower than a lower temperature threshold, thereby reducing the relative temperature difference between the process fluid in the heat exchanger 130 and the flow of air passing through the heat exchanger duct 105 and reducing the amount of cooling of the process fluid within the heat exchanger 130. Conversely, the controller 148 may be configured to supply the additional air supply opening 141 with a relatively cool supply of air (or a relatively small flow rate of the relatively hot supply of air) when the temperature of the process fluid exiting the heat exchanger 130 is above an upper temperature threshold, thereby increasing the relative temperature difference between the process fluid in the heat exchanger 130 and the flow of air passing through the heat exchanger duct 105 and increasing the amount of cooling of the process fluid within the heat exchanger 130.

In alternative arrangements, the heat exchanger assembly may comprise only one of the supplementary air supply opening 140 and the additional air supply opening 141.

Figure 13:
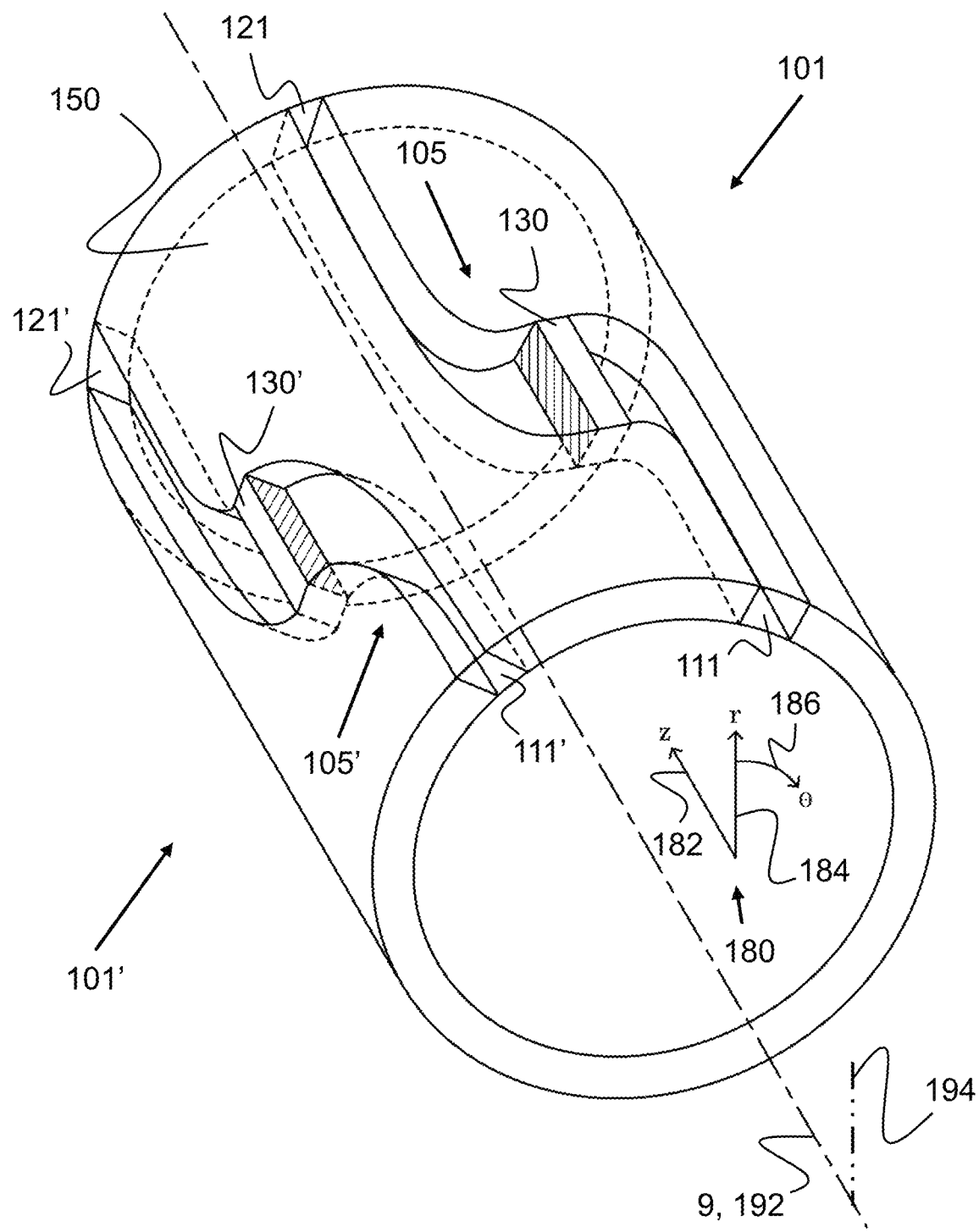
FIG. 13 is a perspective view of a first example heat exchanger arrangement in accordance with the present disclosure.

FIG. 13 shows a perspective view of a first example heat exchanger arrangement. 201 comprising a plurality of heat exchanger assemblies, wherein each heat exchanger assembly is in accordance with any of the examples described above, with like reference numerals indicating common or similar features. In the example of FIG. 12, the plurality of heat exchanger assemblies includes a first heat exchanger assembly 101 and a second heat exchanger assembly 101'. It will, however, be appreciated that the heat exchanger arrangement 201 may comprise additional heat exchanger assemblies in accordance with example heat exchanger assemblies described above.

The first heat exchanger assembly 101 is circumferentially offset from the second heat exchanger assembly 101' with respect to the axis 9. Accordingly, the first heat exchanger 130 of the first heat exchanger assembly 101 is circumferentially offset with respect to the second heat exchanger 130' of the second heat exchanger assembly 101' with respect to the axis 9. The heat exchanger duct 105 of the first heat exchanger assembly 101 and the heat exchanger duct 105 of the second heat exchanger assembly 102 are configured to convey a respective flow of air from respective inlet region openings 111 to respective outlet region openings 121.

The first heat exchanger assembly 101 and the second heat exchanger assembly 101' are separated by a septum wedge 150. The septum wedge 150 partially defines the first heat exchanger duct 105 and the second heat exchanger duct 105'. In other words, the septum wedge 150 partially defines the internal geometry of the first heat exchanger duct 105 and the internal geometry of the second heat exchanger duct 105'. The septum wedge 150 may be integrally formed by a casing of the gas turbine engine 10, such as an inner bypass casing of the gas turbine engine 10. The provision of the septum wedge 150 between each heat assembly allows the internal geometry of each heat exchanger duct to be defined without significantly increasing a part count (and therefore a complexity) of the heat exchanger arrangement 201.

Figure 14:
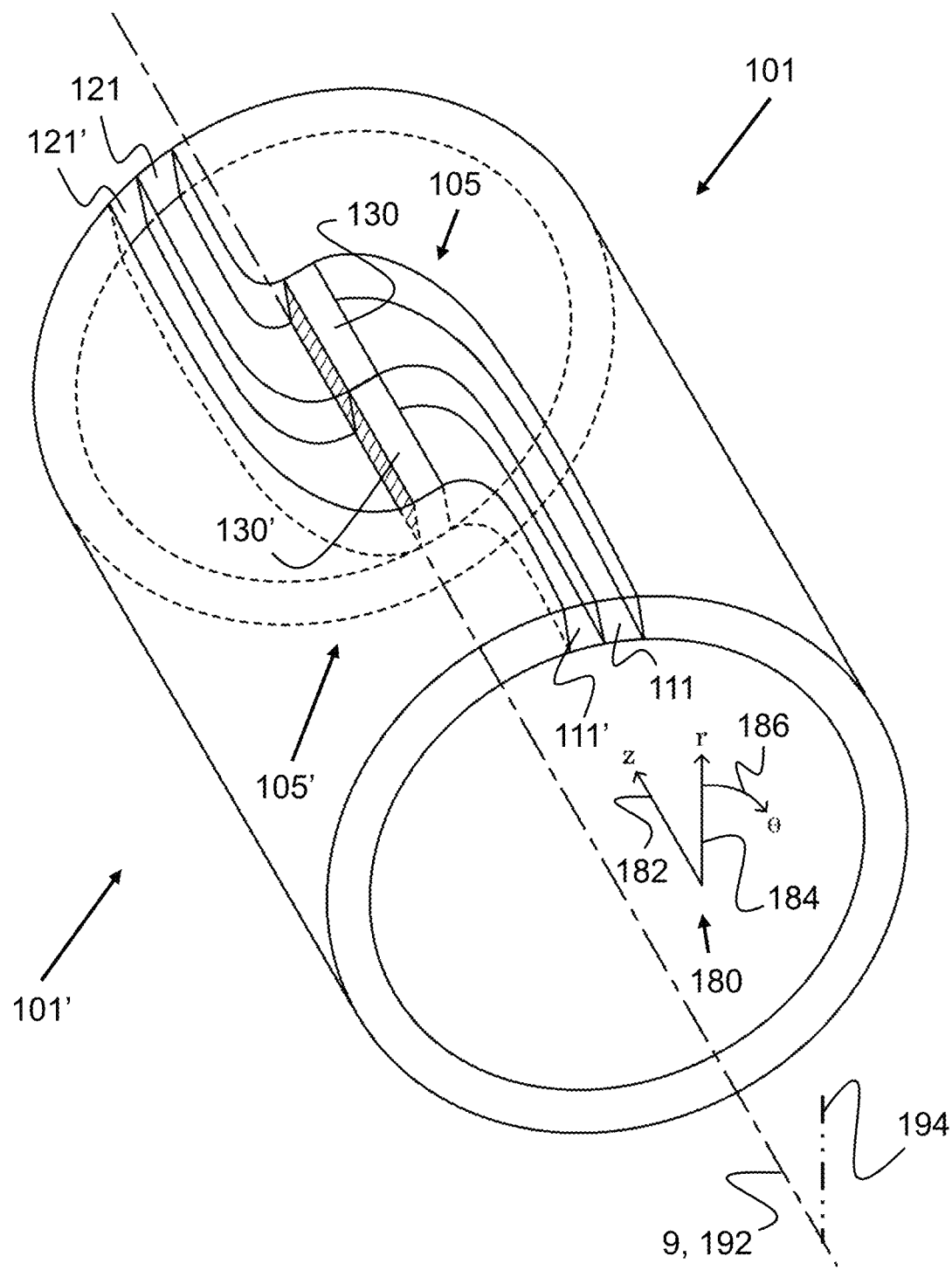
FIG. 14 is a perspective view of a second example heat exchanger arrangement in accordance with the present disclosure.

FIG. 14 shows a perspective view of a second example heat exchanger arrangement 202. The second example heat exchanger arrangement 202 is generally similar to the first example heat exchanger arrangement 201, with like reference numerals indicating common or similar features. However, the inflection region of the first heat exchanger assembly 101 is axially offset from the inflection region of the second heat exchanger assembly 101' with respect to the axis 9. Further, the heat exchanger 130 of the first heat exchanger assembly 101 and the heat exchanger 130' of the second heat exchanger assembly 101' are axially offset with respect to the axis 9 of the core 11 of the gas turbine engine 10 (i.e. offset with respect to each other along the axial direction 182). In addition, the heat exchanger 130 of the first heat exchanger assembly 101 and the heat exchanger 130' of the second heat exchanger assembly 101' are circumferentially aligned with respect to the axis 9. The heat exchanger duct 105 of the first heat exchanger assembly 101 and the heat exchanger duct 105 of the second heat exchanger assembly 102 are adapted to convey a flow of air from respective inlet region openings 111 to respective outlet region openings 121.

The first heat exchanger duct 105 abuts the second heat exchanger duct 105' to provide a compact heat exchanger arrangement 202. However, in other examples, the first heat exchanger duct 105 may not abut the second heat exchanger duct 105. In such examples, the first heat exchanger duct 105 and the second heat exchanger duct 105 may be defined by a septum wedge 150, as described above.

The example heat exchanger arrangements described above allow a plurality of heat exchanger assemblies to be easily disposed around the core 11 of the gas turbine engine 10, without requiring an increase in the height of each heat exchanger assembly.

It will be understood that the invention is not limited to the examples above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

We claim:

1. A gas turbine engine comprising an engine core, a bypass duct and a heat exchanger assembly, the heat exchanger assembly comprising a heat exchanger and a heat exchanger duct having an inlet region, an inflection region and an outlet region, wherein
   the inlet region is configured to receive a flow of air from the bypass duct, the inflection region is configured to transfer the flow of air from the inlet region to the outlet region, and the outlet region is configured to discharge the flow of air into the bypass duct,
   a direction of a centreline of the heat exchanger duct has a tangential component with respect to a principal rotational axis of the gas turbine engine at one or more of the inlet region, the inflection region and the outlet region,
   the heat exchanger is within the inflection region and configured to transfer heat generated by the gas turbine engine into the flow of air as it passes through the inflection region,
   the heat exchanger assembly is radially outward of the engine core and radially inward of the bypass duct,
   the heat exchanger is configured to transfer heat generated by the engine core into the flow of air as it passes through the inflection region,
   the heat exchanger duct comprises an inlet region opening and an outlet region opening,
   the inlet region is configured to receive the flow of air from the bypass duct of the gas turbine engine via the inlet region opening,
   the outlet region is configured to discharge the flow of air into the bypass duct via the outlet region opening,
   the inlet region opening is at a first circumferential position about the principal rotational axis, and
   the outlet region opening is at a second circumferential position about the principal rotational axis different from the first circumferential position.

2. A gas turbine engine as claimed in claim 1, wherein the heat exchanger comprises an interior portion configured to transfer the heat generated by the gas turbine engine into the flow of air, an inlet face configured to transfer the flow of air to the interior portion and an outlet face configured to discharge the flow of air from the interior portion, wherein the inlet face and the outlet face are offset in a tangential direction with respect to the principal rotational axis.

3. A gas turbine engine as claimed in claim 1, wherein the heat exchanger comprises a plurality of distinct fluid circuits, each of the distinct fluid circuits being fluidically connected to a respective distinct external fluid circuit of the engine core.

4. A gas turbine engine as claimed in claim 1, wherein the centreline of the heat exchanger duct at the inlet region and the centreline of the heat exchanger duct at the outlet region are parallel.

5. A gas turbine engine as claimed in claim 1, wherein the centreline of the heat exchanger duct at the inlet region is coplanar with the principal rotational axis and the centreline of the heat exchanger duct at the outlet region is coplanar with the principal rotational axis.

6. A gas turbine engine as claimed in claim 1, wherein the cross-sectional area of the heat exchanger duct on a plane perpendicular to the centreline at the inflection region is greater than the cross-sectional area of the heat exchanger duct on a plane perpendicular to the centreline of the heat exchanger duct at the inlet region and the cross-sectional area of the heat exchanger duct on a plane perpendicular to the centreline of the heat exchanger duct at the outlet region.

7. A gas turbine engine as claimed in claim 1, wherein the inlet region and the outlet region are circumferentially offset with respect to the principal rotational axis such that the inlet region and the outlet region do not circumferentially overlap with respect to the principal rotational axis.

8. A gas turbine engine as claimed in claim 1, wherein the centreline of the heat exchanger duct is curved along the inflection region and wherein the curvature of the centreline of the heat exchanger duct changes sign along the inflection region.

9. A gas turbine engine as claimed in claim 1, wherein a direction of the centreline of the heat exchanger duct does not have a radial component with respect to the principal rotational axis.

10. A gas turbine engine as claimed in claim 1, wherein the inflection region of the heat exchanger duct upstream of the heat exchanger is defined by a first concave surface and a first convex surface circumferentially separated from each other with respect to the principal rotational axis, wherein the heat exchanger duct downstream of the heat exchanger is defined by a second concave surface and a second convex surface circumferentially separated from each other with respect to the principal rotational axis.

11. A gas turbine engine as claimed in claim 10, wherein the heat exchanger assembly further comprises a supplementary air supply opening positioned downstream of the heat exchanger at or adjacent the second convex surface and configured to supply a supplementary flow of air into the heat exchanger duct, onto or adjacent the second convex surface.

12. A gas turbine engine as claimed in claim 10, wherein the heat exchanger assembly further comprises an additional air supply opening positioned upstream of the heat exchanger at or adjacent the first concave surface and configured to supply an additional flow of air into the heat exchanger duct, onto or adjacent the first concave surface.

13. A gas turbine engine as claimed in claim 1, further comprising an additional heat exchanger assembly, the additional heat exchanger assembly being in accordance with the heat exchanger assembly of claim 1.

14. A gas turbine engine as claimed in claim 13, wherein the heat exchanger assembly and the additional heat exchanger assembly are circumferentially offset with respect to the principal rotational axis.

15. A gas turbine engine as claimed in claim 13, further comprising a septum wedge, wherein the septum wedge is between and partially defines the heat exchanger duct of the heat exchanger assembly and the heat exchanger duct of the additional heat exchanger assembly.

16. A method of operating the gas turbine engine as claimed in claim 11, the method comprising:
   determining a parameter of the gas turbine engine; and
   varying a parameter of the supplementary flow of air into the heat exchanger duct based on the parameter of the gas turbine engine,
   wherein the parameter of the gas turbine engine includes at least one of a pressure of the flow of air within the bypass duct and a temperature of a process fluid exiting the heat exchanger,
   wherein the parameter of the supplementary flow of air is a flow rate of the supplementary flow of air into the heat exchanger duct.

17. A heat exchanger assembly for a gas turbine engine with an engine core, the heat exchanger assembly comprising a heat exchanger and a heat exchanger duct having an inlet region, an inflection region and an outlet region, wherein
   the inlet region is configured to receive a flow of air from a bypass duct of the gas turbine engine, the inflection region is configured to transfer the flow of air from the inlet region to the outlet region, and the outlet region is configured to discharge the flow of air into the bypass duct,
   a direction of a centreline of the heat exchanger duct has a tangential component with respect to a principal rotational axis of the gas turbine engine at one or more of the inlet region, the inflection region and the outlet region, and
   the heat exchanger is within the inflection region and configured to transfer heat generated by the gas turbine engine into the flow of air as it passes through the inflection region,
   the heat exchanger assembly is configured to be radially outward of the engine core and radially inward of the bypass duct,
   the heat exchanger is configured to transfer heat generated by the engine core into the flow of air as it passes through the inflection region,
   the heat exchanger duct comprises an inlet region opening and an outlet region opening,
   the inlet region is configured to receive the flow of air from the bypass duct of the gas turbine engine via the inlet region opening,
   the outlet region is configured to discharge the flow of air into the bypass duct via the outlet region opening,
   the inlet region opening is at a first circumferential position about the principal rotational axis, and
   the outlet region opening is at a second circumferential position about the principal rotational axis different from the first circumferential position.

* * * * *